United States Patent
Rechlin

(10) Patent No.: US 12,110,716 B2
(45) Date of Patent: Oct. 8, 2024

(54) AIRCRAFT SEAT MODULE

(71) Applicant: RECARO Aircraft Seating GmbH & Co. KG, Schwaebisch Hall (DE)

(72) Inventor: Alexander Rechlin, Schwaebisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 141 days.

(21) Appl. No.: 18/001,386

(22) PCT Filed: May 17, 2021

(86) PCT No.: PCT/EP2021/063026
§ 371 (c)(1),
(2) Date: Apr. 27, 2023

(87) PCT Pub. No.: WO2021/249726
PCT Pub. Date: Dec. 16, 2021

(65) Prior Publication Data
US 2023/0265682 A1    Aug. 24, 2023

(30) Foreign Application Priority Data
Jun. 12, 2020 (DE) .................... 10 2020 115 567.0

(51) Int. Cl.
*E05B 41/00* (2006.01)
*B64D 11/06* (2006.01)
(Continued)

(52) U.S. Cl.
CPC .......... *E05B 81/08* (2013.01); *B64D 11/0606* (2014.12); *E05B 41/00* (2013.01);
(Continued)

(58) Field of Classification Search
CPC ..... E05B 81/08; E05B 41/00; B64D 11/0606; B64D 11/06; E05C 17/56
See application file for complete search history.

(56) References Cited

U.S. PATENT DOCUMENTS

| 11,174,029 B2 * | 11/2021 | Nicholas ............ B64D 11/0601 |
| 2013/0241247 A1 * | 9/2013 | Wallace ............ B64D 11/0604 |
| | | 297/118 |

(Continued)

FOREIGN PATENT DOCUMENTS

| DE | 10 2018 126 680 A1 | 4/2020 |
| EP | 3 225 548 A1 | 10/2017 |

(Continued)

OTHER PUBLICATIONS

German Search Report issued Apr. 6, 2022 in corresponding DE Patent Application No. 10 2020 115 567.0 (and English translation).

(Continued)

*Primary Examiner* — Justin M Benedik
(74) *Attorney, Agent, or Firm* — Posz Law Group, PLC

(57) ABSTRACT

An aircraft seat module having a flight passenger seating area has a door unit which in at least one operating state is configured at least to close a passage region to the flight passenger seating area, and has a locking device for the door unit, which is configured to lock the door unit in an open position, in particular a maximally open stowage position, and to this end comprises at least one actuator device which has at least two movably supported locking elements, which are in each case adjustable between a locking position and an unlocking position,
wherein that the locking device has a locking state indication unit which at least in the maximally open position of the door unit is configured to detect and indicate incomplete locking of at least one of the two locking elements.

13 Claims, 5 Drawing Sheets

(51) Int. Cl.
  *E05B 81/08* (2014.01)
  *E05B 81/18* (2014.01)
  *E05B 81/28* (2014.01)
  *E05B 81/70* (2014.01)
  *E05C 1/08* (2006.01)
  *E05C 17/60* (2006.01)

(52) U.S. Cl.
  CPC .............. *E05B 81/18* (2013.01); *E05B 81/28* (2013.01); *E05B 81/70* (2013.01); *E05C 1/08* (2013.01); *E05C 17/60* (2013.01)

(56) References Cited

U.S. PATENT DOCUMENTS

2018/0281963 A1* 10/2018 Dowty ............... B64D 11/0606
2021/0163140 A1*  6/2021 Jasny ................ B64D 11/0602

FOREIGN PATENT DOCUMENTS

WO   2017/066559 A1   4/2017
WO   2020/020658 A1   1/2020

OTHER PUBLICATIONS

International Preliminary Report on Patentablility of the International Searching Authority mailed Dec. 13, 2022 in corresponding international application No. PCT/EP2021/063026 (English Translation Only).
International Search Report of the International Searching Authority mailed Aug. 20, 2021 in corresponding International application No. PCT/EP2021/063026 (English Translation Only).

* cited by examiner

AIRCRAFT SEAT MODULE

CROSS REFERENCE TO RELATED APPLICATIONS

This application is based on and incorporates herein by reference the German patent application DE 10 2020 115 567.0 filed on Jun. 12, 2020, as well as the international patent application PCT/EP2021/063026, filed on May 17, 2021.

PRIOR ART

The invention relates to an aircraft seat module.

An aircraft seat module having a flight passenger seating area, with a door unit which in at least one operating state is configured to at least close a passage region to the flight passenger seating area, with a locking device for the door unit, which is configured to lock the door unit in an open position, in particular a maximally open stowage position, and to this end comprises at least one actuator device which has at least two movably supported locking elements which are in each case adjustable between a locking position and an unlocking position, has already been proposed.

It is proposed that the locking device has a locking state indication unit which at least in the maximally open state of the door unit is configured to detect and indicate incomplete locking of at least one of the two locking elements.

The object of the invention lies in particular in providing a device of the generic type, which has improved properties in terms of safety. The object is achieved according to the invention.

The invention proceeds from an aircraft seat module having a flight passenger seating area, having a door unit which in at least one operating state is configured to at least close a passage region to the flight passenger seating area, having a locking device for the door unit, which is configured to lock the door unit in an open position, in particular a maximally open stowage position, and to this end comprises at least one actuator device which has at least two movably supported locking elements which are in each case adjustable between a locking position and an unlocking position.

It is proposed that the locking device has a locking state indication unit which at least in the maximally open state of the door unit is configured to detect and indicate incomplete locking of at least one of the two locking elements.

The term "aircraft seat module" is preferably understood to be a module which defines a flight passenger seating area and to this end comprises at least one enclosure element which at least partially separates the flight passenger seating area from a remaining cabin area, at least one aircraft seat disposed in the flight passenger seating area, and further elements of the flight passenger seating area such as, in particular, a console, an ottoman and/or a screen unit. The aircraft seat is preferably realized as a single seat or as a double seat. A "flight passenger seating area" is preferably understood to be an area in which an aircraft seat, preferably an aircraft seat realized as a single seat, or a seat unit formed from two aircraft seats, is disposed and which is configured to accommodate at least one passenger during a flight in an aircraft. Further elements which can be utilized by a passenger, such as, in particular, a console, an ottoman, stowage possibilities, storage elements and/or entertainment devices, are preferably disposed in a flight passenger seating area. The flight passenger seating area is realized as a sub-area of a cabin, preferably of an aircraft cabin. A flight passenger seating area is preferably contiguous to at least one aisle region of the cabin. A "contiguous cabin area" is preferably understood to be an area of the cabin which is directly contiguous to the flight passenger seating area, such as preferably an aisle region by way of which the flight passenger seating area can be reached by a passenger. A "door unit" is preferably understood to be a functional group which in at least one operating state is configured to at least partially separate the at least one flight passenger seating area from the remainder of the cabin, preferably from at least one aisle region of the cabin. The door unit, in at least one operating state, preferably separates the at least one flight passenger seating area at least partially physically, in particular such that a passage is blocked, and at least partially visually, in particular so as to at least partially block the view and preferably so as to completely block the view, from the remainder of the cabin, in particular up to a height of the at least one enclosure element. The door unit is adjustable at least between an open position and a closed position. The door unit can preferably additionally be held in at least one intermediate position between the open state and the closed state. The door unit is preferably formed from a solid material such in particular, a plastics material, for example a fiber-reinforced plastics material, a composite material (composite board) such as, for example, a sandwich material with a honeycomb core, a metal such as, in particular, aluminum, or by a frame, for example an aluminum frame with a cover from a textile or leather material. A door unit can preferably also be implemented as a simple dividing element such as, for example, a privacy divider. A "passage region" is in particular understood to be an area which is disposed between the flight passenger seating area and the aisle region of the cabin and by way of which the two areas are connected to one another. A person, in particular a passenger, can move between the flight passenger seating area and the aisle region of the cabin by way of the passage region. A "bearing device" is in particular understood to be a device which is configured to support a component such as, preferably, the door unit, so as to be movable between at least two positions. The bearing device is preferably particularly configured to support the door unit so as to be movable between a maximally closed position and a maximally open position. The bearing device is preferably configured to support the door unit so as to be movable along a movement path, wherein the movement path is preferably formed by a straight movement axis. The door unit, by means of the bearing device, is axially adjustable, preferably displaceable, along the movement path, between the open position and the closed position. A "maximally open stowage position" is preferably understood to be a position of the door unit in which the door unit is preferably moved completely out of the passage region and as a result completely releases the passage region. In the maximally open position, the door unit is preferably disposed so as to completely overlap the enclosure unit. In the maximally open position, the door unit, when viewed from an aisle region, is disposed completely behind the enclosure unit. In principle, it is conceivable that in the maximally open position the door unit is disposed in an interior space of the enclosure unit provided for this purpose. A "closed position" is preferably understood to be a position of the door unit in which the door unit completely closes the passage region. The door unit in the closed position preferably extends across the entire distance between those enclosure elements of the enclosure unit which form the passage region. A "locking device" is preferably understood to be a device which is configured to lock in a positionally fixed manner an element, such as preferably the door unit, in at least one position, preferably in the maximally open position, thus to establish this position in a positionally fixed manner. The locking device is preferably configured to lock the door unit in a form-fitting and/or force-fitting manner. The locking device preferably has at least one, particularly preferably two, locking element(s). A locking element, in a locking position of the locking device, is preferably configured to engage in a form-fitting manner in a mating part of equivalent implementation. The looking element in the locking position of the locking device is preferably disposed in a locking position. In an unlocking position of the locking device, the locking element is preferably disposed in an unlocking position in which the locking element does not block the locking position. The locking element in the unlocking position preferably does not contact in a form-fitting manner the corresponding mating part in which the locking element engages for locking the locking device in a form-fitting manner. A "locking position of the locking device" is understood to be a position of the locking device in which the door unit is able to be locked in a positionally fixed manner. In the locking position of the locking device, a locking element is preferably disposed in a locking position in which the locking element is configured to engage in the mating part of equivalent implementation The subject matter to be locked, in particular the subject matter of the door unit, is preferably only in one defined position, preferably the closed position. In principle, it is conceivable that the door unit is not locked when the locking device is in the locking position of the latter, specifically when the door unit is not disposed in the closed position thereof. An "unlocking position of the locking device" is preferably understood to be a position of the locking device in which the locking position is configured to release a movement of the door unit and not to block the latter. The door unit in the unlocking position is released and can be moved from the open position to the closed position. The door unit in the unlocking position of the locking device can preferably be adjusted between the open position and the closed position. An "electrically and/or electronically actuatable actuator device" is in particular understood to be a device which has an electrical or electronically actuatable actuator, the latter in the event of electrical and/or electronic actuation changing an operating state, such as carrying out, for example, a movement, preferably an axial movement, and/or generating a magnetic field. A "locking state indication unit" is preferably understood to be a unit which detects a state of locking of the locking elements, in particular incomplete locking of the locking elements of the locking device, and emits a corresponding optical, acoustic, optical and/or electronic signal by way of which a corresponding state, in particular incomplete locking of the locking element, is indicated, i.e. displayed. The locking state indication unit is preferably configured to indicate if one of the two locking elements is incompletely locked and the door unit as a result is indeed partially locked but not locked in an orderly manner by both locking elements. "Incomplete locking of a locking element" is in particular to mean a state in which the locking element does not—as is provided for the locking position—completely engage in a form-fitting manner in a corresponding mating part. In the event of incomplete locking of a locking element, the locking element does not engage in a form-fitting manner in the mating part that is configured for this purpose. In the event of incomplete locking of a locking element, the locking element cannot hold the door unit in the locking position. "Configured" is particular to mean specifically conceived and/or equipped.

That an object is configured for a specific function is in particular understood to mean that the object fulfils and/or carries out this specific function in at least one state of application and/or operation. Incorrect locking of the door unit can be determined and indicated in an advantageously simple manner by an implementation according to the invention. As a result of the design embodiment of the invention, it can be identified and indicated in particular if one of at least two locking elements is not correctly locked. As a result, an incorrectly locked door unit can be easily pointed out to a crew member or a passenger, for example. As a result, dangerous situations as a result of incorrectly locked door units can preferably be avoided if it can be identified by a check which is easy to carry out, for example prior to the aircraft landing, whether a door unit is correctly locked. A safety aspect of the aircraft seat device can be enhanced in particular in an advantageous manner as a result.

It is furthermore proposed that the locking state indication unit has an indication unit which indicates incomplete locking of one the two locking elements, is disposed separately from the locking elements and is preferably disposed in an upper region of the door unit. An "indication unit" is preferably understood to be a unit which can emit an optical, acoustic and/or haptic signal which can be detected by a person, preferably by a crew member. "Disposed separately" is preferably understood to mean that the corresponding elements such as, in particular, the indication unit and the locking elements, are disposed so as to be spatially separated from one another and preferably do not have any direct connection to one another. An "upper region of the door unit" is preferably understood to be an upper third, particularly preferably an upper peripheral region, that faces away from the cabin floor. While the indication unit is advantageously disposed in an upper region of the door unit, it is in principle also conceivable that the indication unit is disposed in another region on the door unit or of an enclosure unit. In principle, it is also conceivable that the indication unit is disposed in a cabin floor-proximal region, or that the indication unit is disposed in a central region of the door unit or of the enclosure unit. The indication unit is advantageously disposed in a region that can readily be seen by a person.

As a result, the indication unit can advantageously be disposed independently of the locking elements and, in a particularly advantageous manner, in an area which can readily be seen by a person.

It is furthermore proposed that the locking state indication unit in the event of incomplete locking of one of the locking elements is configured to permit a displacement of the locked door unit by an indication length in the closing direction. An "indication length" is preferably understood to be a defined length by way of which the door unit can be displaced in the closing direction so that incomplete locking can be identified. The indication length is preferably less than 30 mm, preferably below 20 mm, and in a particularly preferred design embodiment less than 10 mm. If the indication length is detected purely electronically, for example by a sensor device, an indication length of below 10 mm, for example 5 mm, is conceivable. If the indication length is detected directly and purely optically by a person, the indication length is preferably 25 mm (1 inch). Incomplete locking can be particularly easily identified as a result.

It is furthermore proposed that the locking state indication unit has at least one rocker element which is configured to contact the locking elements in the locking position thereof. A "rocker element" is preferably understood to be a movably supported element which can be pivoted by a defined pivot angle in two opposite rotating directions around a pivot axis which is preferably supported so as to be substantially centric. The rocker element is preferably configured to provide a contact surface for the locking elements on which the locking elements bear. The rocker element is preferably configured to be held in a neutral position by the completely locked locking elements. As a result, the locking indication unit can be mechanically implemented in a particularly simple and advantageous manner.

It is furthermore proposed that the rocker element is supported so as to be pivotable around a pivot axis which runs coaxially with the axes of movement of the locking elements and is equidistant from the axes of movement of the locking elements. As a result, the rocker element can be attached in a particularly advantageous manner.

It is furthermore proposed that the rocker element in the event of incomplete locking of one of the locking elements is configured to be tilted by the other locking element and, as a result, to permit a displacement of the locked door unit by an indication length in the closing direction. As a result, incomplete locking of a locking element can be indicated by the rocker element in a particularly simple manner.

It is moreover proposed that the locking state indicator unit comprises at least one sensor device which is configured to, in particular indirectly, detect incomplete locking of one of the locking elements. A "sensor device" is preferably understood to be a device which is configured to detect at least one parameter and/or a physical property, wherein the recording can be performed actively such as, in particular, by generating and emitting an electric measuring signal, and/or passively such as, in particular, by detecting changes in the properties of a sensor component. Various sensor devices that appear expedient to the person skilled in the art are conceivable such as, for example, mechanical sensors (switches) or reed contacts (magnetic switches). A sensor device is preferably configured to emit an electric and/or electronic sensor signal which can preferably be evaluated by a corresponding computer unit. "Indirectly detect" is preferably understood to mean that a parameter to be detected is not detected directly at the element to be detected, such as in particular a locking element, but at another component such as, in particular, at the door unit. Incomplete locking of a locking element can be detected by the locking state indication unit in a particularly simple manner as a result.

It is furthermore proposed that the sensor device is realized integrally with a sensor device that is embodied as a door position sensor. A "door position sensor" is preferably understood to be a sensor which is configured to detect a position of the door unit. The door position sensor is preferably configured to detect an open position of the door unit, in particular a completely open position of the door unit. In principle, it would also be conceivable for the door position sensor to be able to detect an exact position between the open and the closed position of the door unit. As a result, an existing sensor, in particular the door position sensor, can advantageously be used as the sensor unit for indirectly detecting incomplete locking. Component costs in particular can advantageously be minimized as a result.

It is moreover proposed that the indication unit is at least partially implemented by the door unit. As a result, the indication unit can be realized in a particularly simple and cost-effective manner.

It is furthermore proposed that the locking state indication unit for each locking element has one spring-loaded indication element, said spring-loaded indication elements, in the event of the door unit being locked by the respective locking element in the locking position, being configured to be deflected from a first position to a second position. A "spring-loaded indication element" is preferably to be understood to be an indication element which by a spring force is pushed to a first indication position, and by an actuating force acting thereon, preferably a force acting thereon by way of a locking element, can be moved counter to the spring force to a second indication position. In the absence of the actuating force, the spring-loaded indication element is reset in a self-acting manner to the first indication position by the spring force. As a result, an alternative indication unit can be provided for the locking state indication unit.

It is furthermore proposed that the locking state indication unit for each spring-loaded indication element has one viewing window through which a position of the respective indication element can be seen. As a result, a position of the indication elements can be seen in a particularly simple manner by a person.

It is furthermore proposed that the locking state indication unit is of a purely mechanical implementation. The "locking state indication unit being of a purely mechanical implementation" is preferably understood to mean that the locking state indication unit is constructed only from mechanical components and in particular does not have any electric or electronic components. As a result, the locking state indication unit can be implemented in a particularly cost-effective manner.

The aircraft seat module according to the invention here is not to be limited to the application and embodiment described above. In particular, the aircraft seat module according to the invention, for fulfilling a functional mode described herein, can have a number of individual elements, components and units which deviates from a number mentioned herein.

DRAWINGS

Further advantages are derived from the following description of the drawings. Two exemplary embodiments of the invention are illustrated in the drawings. The drawings, the description and the claims contain numerous features in combination. The person skilled in the art will expediently also consider the features individually and combine the latter so as to form expedient further combinations.

DETAILED DESCRIPTION

Figure 1:
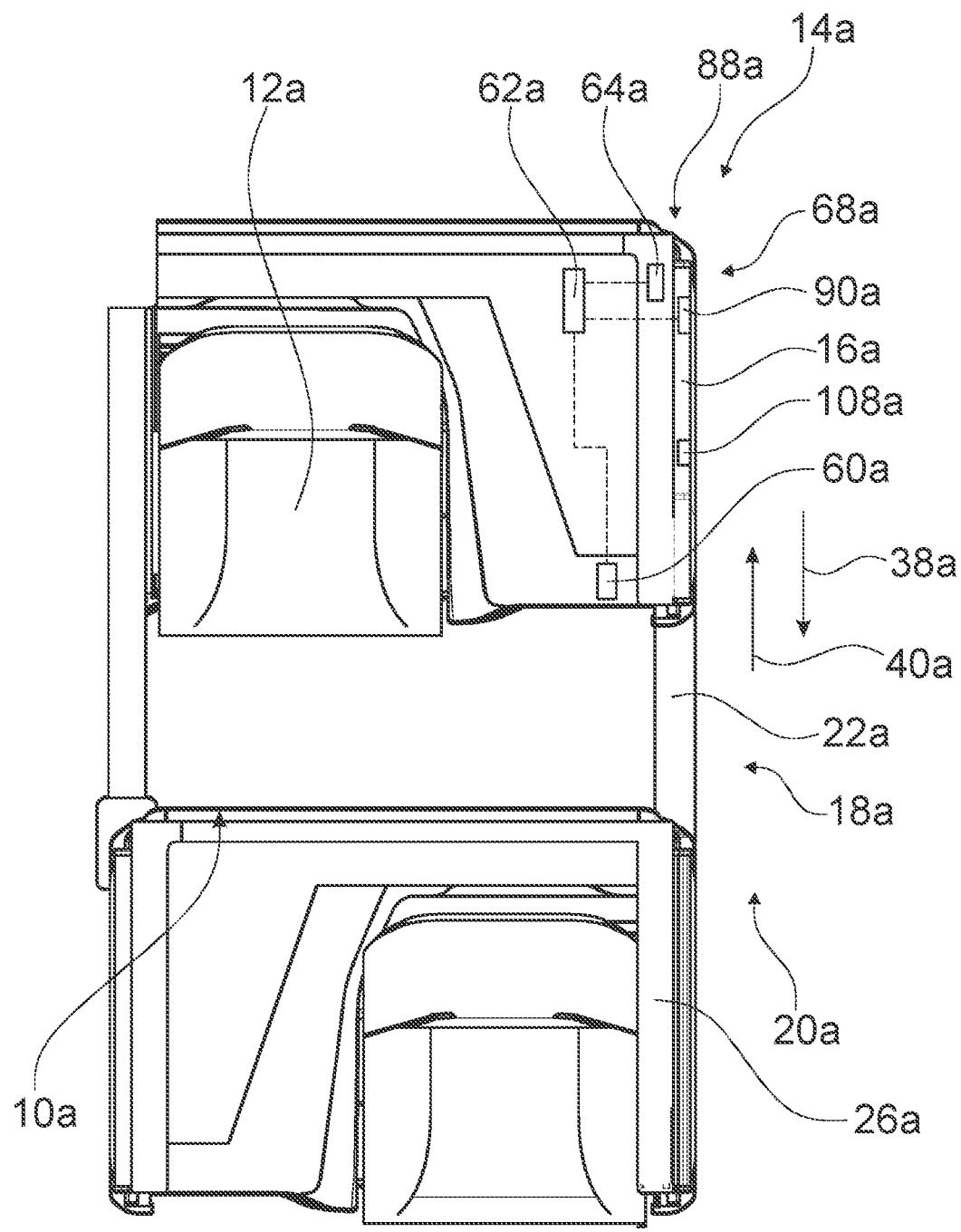
FIG. 1 shows a schematic view of an aircraft seat module, having an enclosure unit and a door unit.
Figure 2:
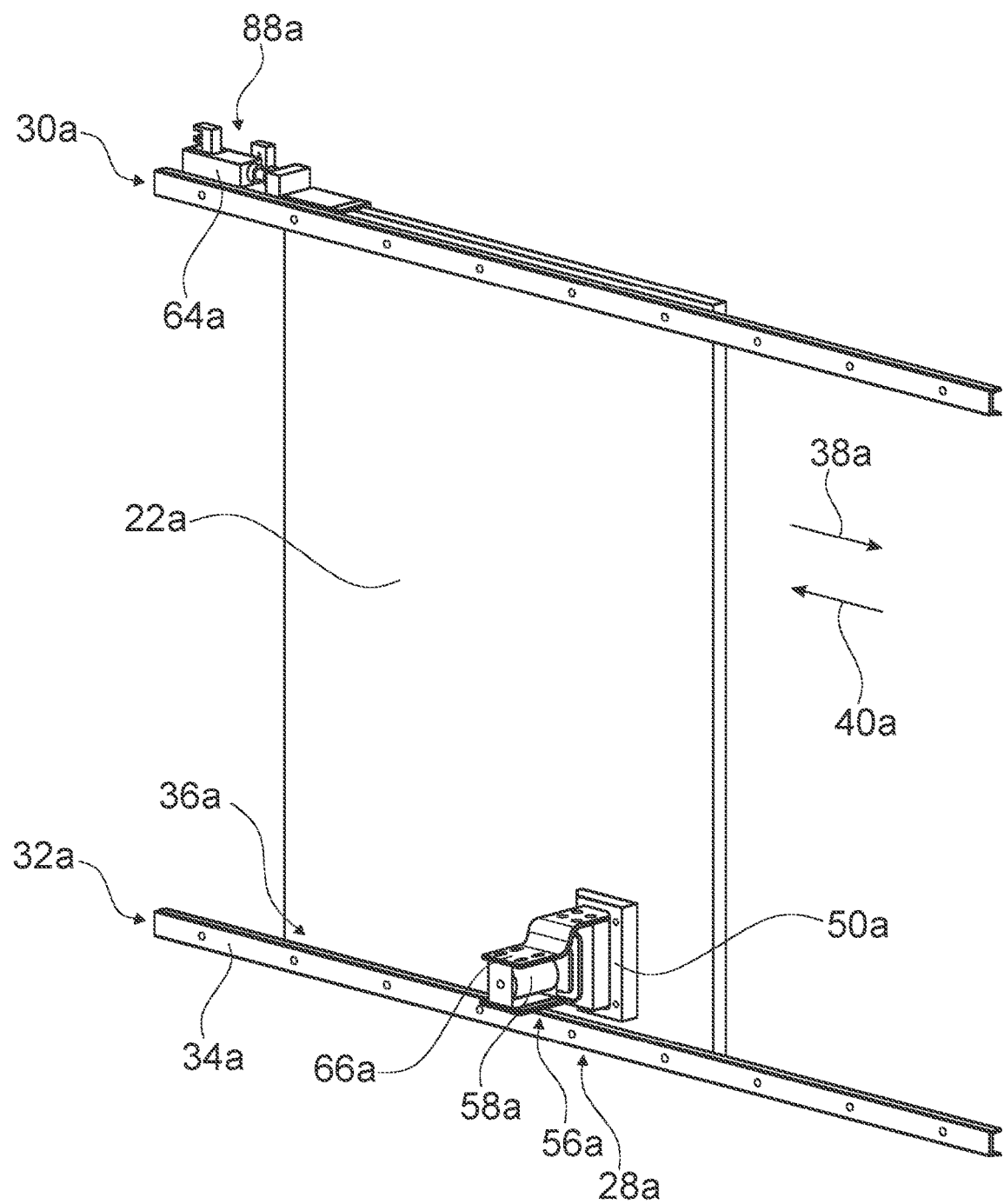
FIG. 2 shows a schematic view of a door unit having a locking device.
Figure 3:
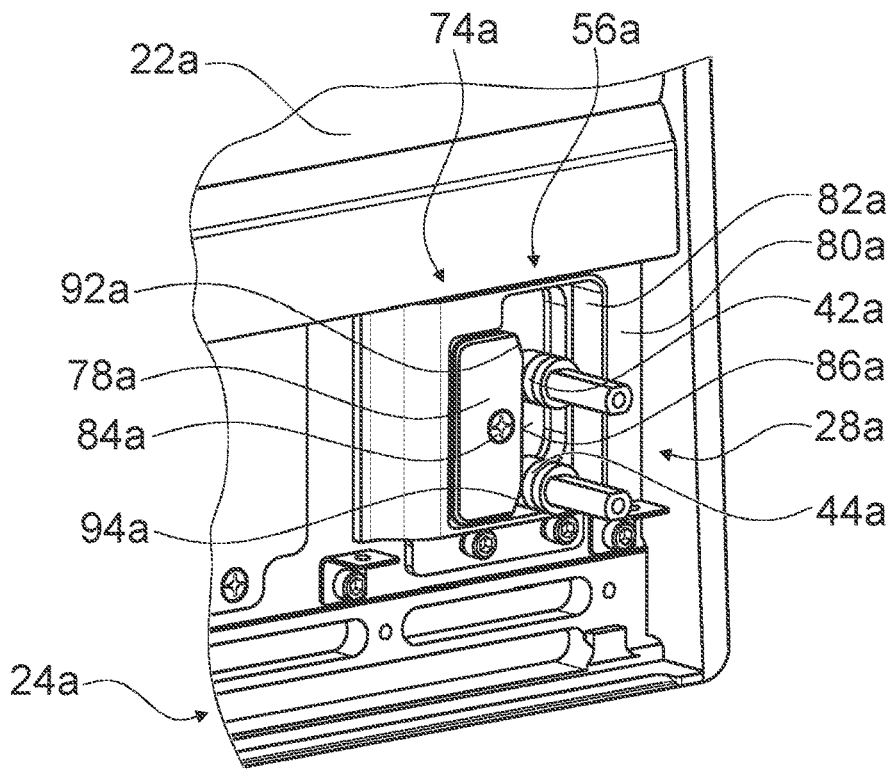
FIG. 3 shows a schematic views of the locking device having two locking elements in the locking position thereof and a locking state indication unit.
Figure 4:
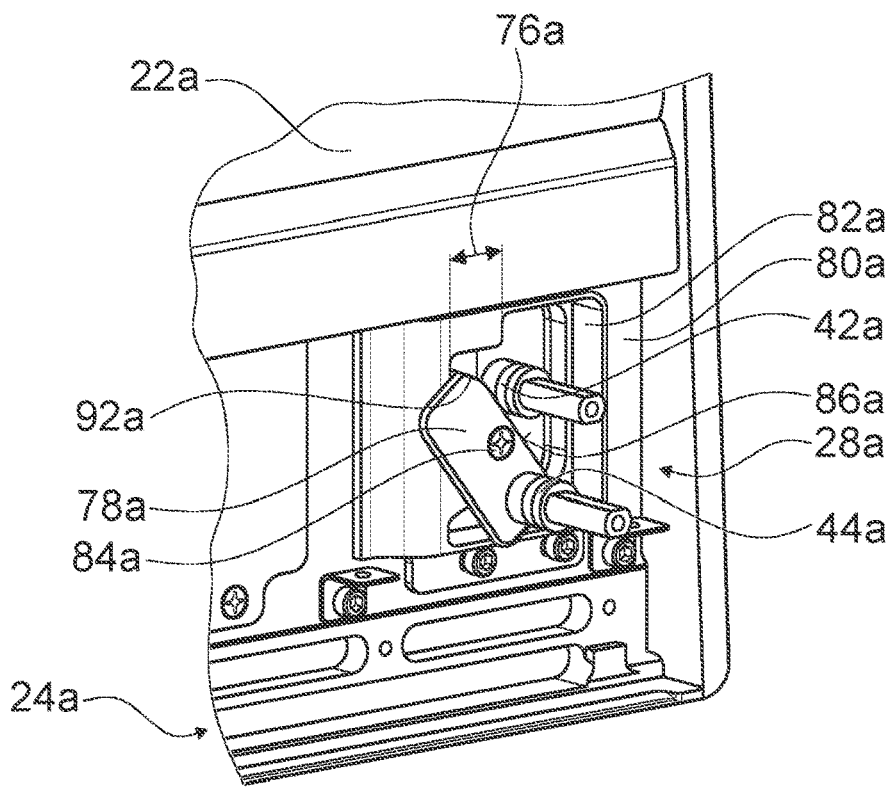
FIG. 4 shows a schematic illustration of the locking device and of the locking state indication unit, having a locking element which is not completely locked.
Figure 5:
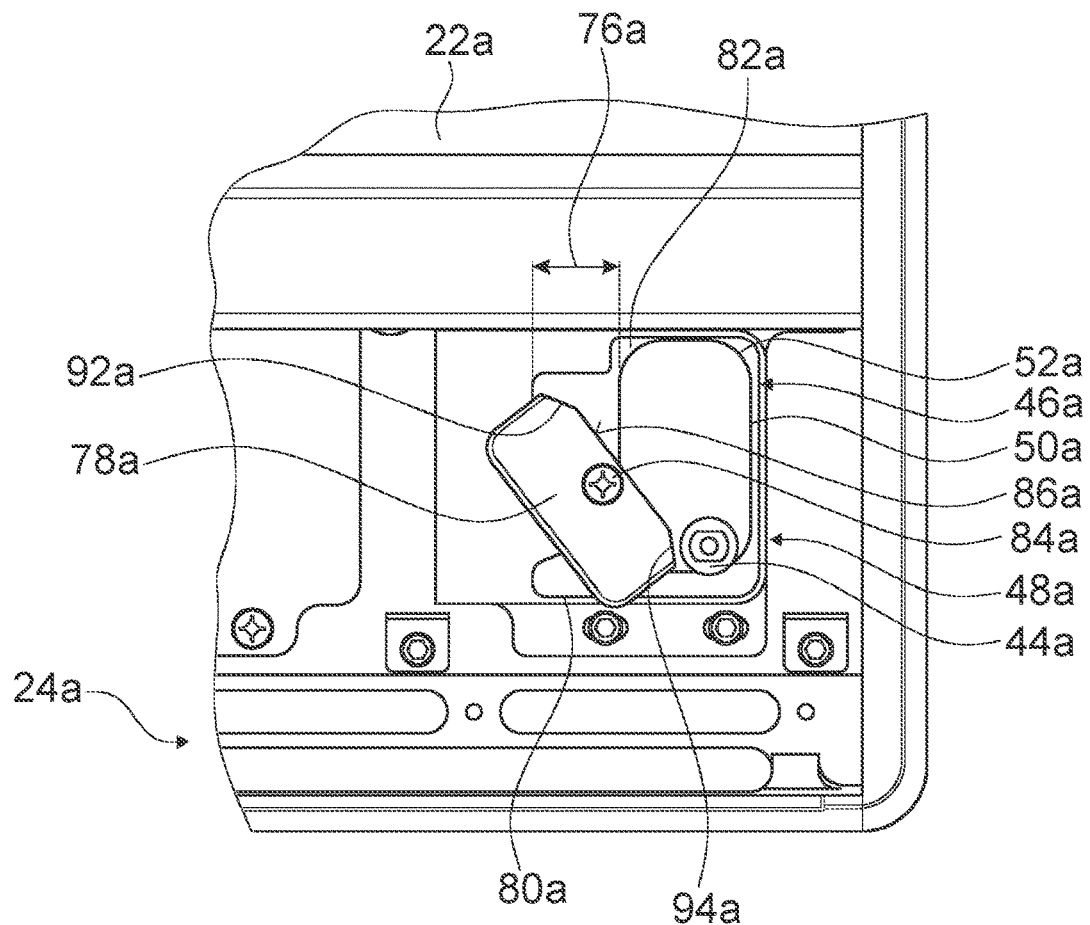
FIG. 5 shows a further schematic illustration of the locking device and of the locking state indication unit, having a locking element which is not completely locked.
Figure 6:
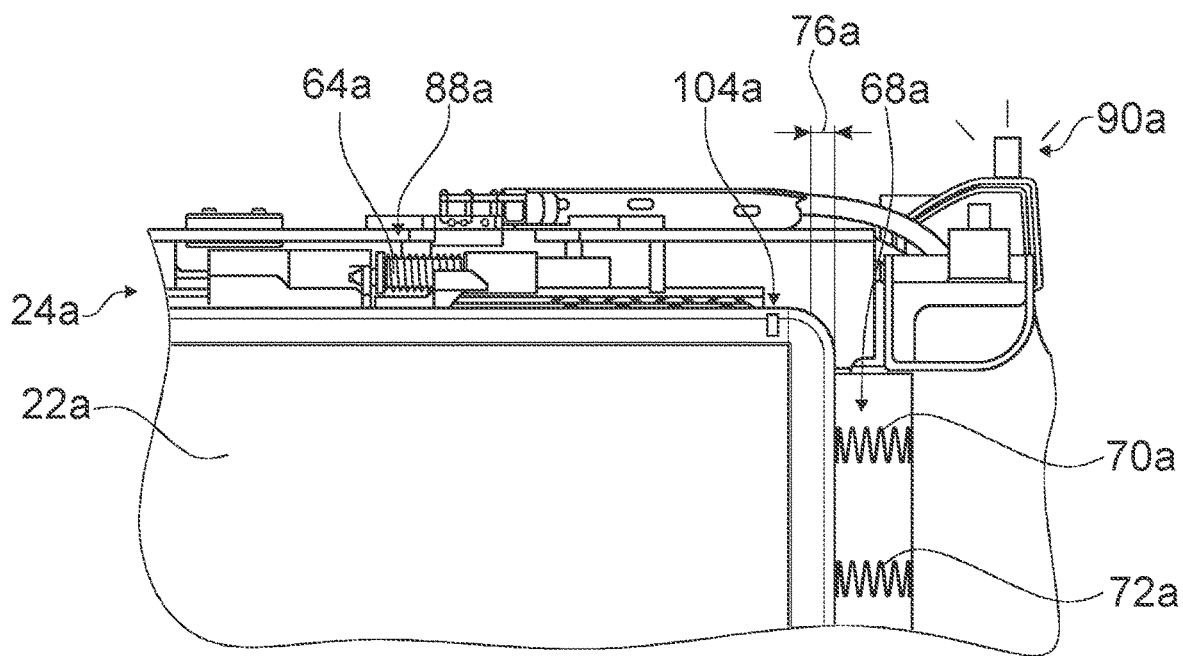
FIG. 6 shows a schematic illustration of the door unit, having a sensor device which is embodied as a door sensor.

An aircraft seat module is shown in FIGS. 1 to 6. The aircraft seat module is realized as part of an interior design of an aircraft cabin. A plurality of aircraft seat modules are preferably disposed in an aircraft cabin. The aircraft seat module forms a flight passenger seating area 10a. The flight passenger seating area 10a is realized as an area which is in particular available to a passenger during a flight. The flight passenger seating area 10a is preferably implemented in particular as a business class or first class flight passenger seating area. The aircraft cabin has at least one aisle region 20a. The fight passenger seating area 10a is able to be reached, in particular by a passenger, by way of the aisle region 20a. The aircraft seat module comprises an aircraft seat 12a which is disposed in the flight passenger seating area 10a. The aircraft seat 12a is preferably implemented in particular as an aircraft seat 12a which is adjustable from at least one sitting position to a reclined position. The aircraft seat module has an enclosure unit 14a. The enclosure unit 14a is configured to at least partially separate the flight passenger seating area 10a from a remainder of the aircraft cabin. The enclosure unit 14a is configured to at least substantially surround the flight passenger seating area 10a. The enclosure unit 14a is configured in particular to spatially separate the flight passenger seating area 10a from a remainder of the aircraft cabin, in particular a cabin aisle, so as to achieve in particular enhanced privacy for a passenger in the flight passenger seating area 10a. The enclosure unit 14a has an enclosure element 16a. The enclosure element 16a at least partially surrounds the flight passenger seating area 10a. In principle, the enclosure element 16a can separate the flight passenger seating area 10a solely or conjointly with an enclosure unit 14a of another aircraft seat module. The enclosure unit 14a forms a passage region 18a. The passage region 18a connects the flight passenger seating area 10a and the contiguous aisle region 20a of the aircraft cabin. A person, in particular a passenger, can make their way through the passage region 18a from the aisle region 20a into the flight passenger seating area 10a, and vice versa. The passage region 18a preferably has a width of 38 cm.

The aircraft seat module comprises a door unit 22a. The door unit 22a at least in one operating state is configured to at least partially separate the flight passenger seating area 10a from a contiguous cabin area, in particular the aisle region 20a. The door unit 22a is configured to lock the passage region 18a in a closed position. The door unit 22a, in the fully closed position, completely blocks the passage region 18a. It is conceivable in particular here that a gap remains in particular in a lower region between the door unit 22a and the cabin floor. The door unit 22a in the fully closed position, at least in a sub-area, extends completely between the enclosure element 16a and a further enclosure element 26a, the latter two delimiting the passage region 18a. The further enclosure element 26a can in particular be an enclosure element of a further enclosure unit that is disposed in front of the enclosure unit 14a and encloses a further aircraft seat. The door unit 22a in an open position is configured to release the passage region 18a. The door unit 22a in the open position is preferably completely moved out of the passage region 18a. The door unit 22a is attached to the enclosure unit 14a, in particular to the enclosure element 16a. In principle, it would likewise be conceivable that the door unit 22a is attached to the further enclosure element 26a of the front enclosure unit.

The aircraft seat module for supporting the door unit 22a has a bearing device 24a. The bearing device 24a is configured to support the door unit 22a so as to be movable on the enclosure unit 14a. The door unit 22a by way of the bearing device 24a is attached to the enclosure element 16a. The door unit 22a by means of the bearing device 24a is adjustable between the open position and the closed position. The bearing device 24a is preferably embodied as a linear bearing device. The door unit 22a by means of the bearing device 24a embodied as a linear bearing device is linearly displaceable between a closed position and an open position. The door unit 22a by means of the bearing device 24a is movable in a closing direction 38a and in an opening direction 40a. The closing direct ion 36a and the opening direction 40a are mutually opposite directions of the movement path along which the door unit 22a is displaceable by means of the hearing device 24a. The closing direction 38a, proceeding from the open position of the door unit 22a, is aligned so as to be parallel to the movement path in the direction of the closed position. The closing direction 38a is directed so as to be parallel to the movement path away from the enclosure element 16a. The opening direction 40a, from the closed position of the door unit 22a, is aligned so as to be parallel to the movement path in the direction of the open position of the door unit 22a. The opening direction 40a is aligned so as to be parallel to the movement path in the direction of the enclosure element 16a.

The bearing device 24a preferably comprises two bearing modules 30a, 32a. The bearing device 24a has the first bearing module 30a and the second bearing module 32a. The first bearing module 30a is configured to support the door unit 22a in an upper region. The first bearing module 30a is in particular disposed in an upper region of the door unit 229. The second bearing module 32a is configured to support the door unit 22a in a lower region. The second bearing module 32a is disposed in a lower region of the door unit 22a. Particularly uniform support of the door unit 22a can be achieved by the two bearing modules 30a, 32a which are disposed on two mutually opposite regions of the door unit 22a. The bearing modules 30a, 32a preferably have in each case one first bearing element 34a, embodied as a linear bearing rail, and disposed so as to be supported in an axially displaceable manner therein a second bearing element 36a. For example, it is conceivable that the first bearing element 34a, embodied as a linear bearing rail, is fixedly connected to the enclosure unit 14a, and that the second bearing element 36a is fixedly connected to the door unit 22a. In principle, it is also conceivable that the two bearing elements 34a, 36a are in each case attached so as to be exactly vice versa.

The aircraft seat module comprises a locking device 28a. The locking device 28a is configured to lock the door unit 22a in the open position. The locking device 28a is configured to lock the door unit 22a in the maximally open stowage position. The open position, in which the locking device 28a can lock the door unit 22a, is preferably understood to be a completely open position. An open position and a completely open position are preferably identical. As opposed to the open position, there is a partially open position and the closed position of the door unit 22a. The locking device 28a is configured to lock the door unit 22a in a locking position, and in an unlocking position to release a movement of the door unit 22a along the movement path of the door unit 22a. As a result of the door unit 22a being locked in the open position, the door unit 22a is advantageously secured and the passage region 18a is released.

The locking device 28a comprises an electrically and/or electronically actuatable actuator device 56a. The actuator device 56a comprises a first locking element 42a. The actuator device 56a comprises a second locking element 44a. A redundancy can advantageously be achieved by the second locking element 44a, as a result of which the locking device 28a still remains operational even in the event of a failure of one of the locking elements 42a, 44a. The locking elements 42a, 44a are implemented as locking pins. The locking elements 42a, 44a, implemented as locking pins, preferably have a circular cross section. In principle, it would also be conceivable that the locking elements 42a, 44a have an oval or rectangular cross section. The locking elements 42a, 44a are implemented substantially identically. The locking elements 42a, 44a are adjustable between a locking position and an unlocking position. The locking elements 42a, 44a are linearly displaceable along a movement axis between the locking position thereof and the unlocking position thereof. The actuator device 56a has a base body 66a. The locking elements 42a, 44a are supported so as to be movable in the base body 66a. The locking elements 42a, 44a are supported so as to be axially displaceable in the base body 66a. The locking elements 42a, 44a for adjustment between the locking position and the unlocking position are axially displaceable. The locking elements 42a, 44a are preferably implemented so as to be spring-loaded. The actuator device 56a for each locking element 42a, 44a has one spring element which impinges in each case the locking elements 42a, 44a with a spring force in one direction. In principle, it would also be conceivable that the actuator device 56a has a common spring element for both locking elements 42a, 44a. The locking elements 42a, 44a are impinged with the spring force in the direction of the locking position of said locking elements 42a, 44a. The locking elements 42a, 44a by means of the spring elements are realized in such a way that their locking position realizes a neutral position which the locking elements 42a, 44a are automatically adjusted into. The two locking elements 42a, 44a are disposed next to one another. The locking elements 42a, 44a are disposed so as to be mutually spaced apart. In particular, the locking elements 42a, 44a are disposed so as to be mutually spaced apart in the closing direction 38a, or the opening direction 40a, respectively. The locking elements 42a, 44a are disposed so as to be spaced apart in parallel to the movement path along which the door unit 22a is displaceable by means of the bearing device 24a. The locking elements 42a, 44a are disposed next to one another in a horizontal direction. In principle, it would also be conceivable that the locking elements 42a, 44a are disposed next to one another in a vertical direction, thus disposed on top of one another. The locking elements 42a, 44a are in each case supported so as to be linearly displaceable in a guiding recess. The guiding recesses are preferably disposed in the base body 66a of the actuator device 56a. The locking elements 42a, 44a for locking the door unit 22a in the locking position are configured to engage in a form-fitting manner in a mating part.

The locking device 28a for each locking element 42a, 44a comprises one form-fit element 46a, 46a in which the corresponding locking element 42a, 44a engages in a form-fitting manner for locking. The form-fit elements 46a, 48a are implemented as recesses. The form-fit elements 46a, 48a, implemented as recesses, have an extent that is larger than the locking elements 42a, 44a engaging therein. The form-fit elements 46a, 48a, in particular in the direction of movement of the door unit 22a, have an extent that is larger than a corresponding extent of the locking elements 42a, 44a. As a result, a corresponding locking element 42a, 44a that engages in the form-fit element 46a, 48a has a defined freedom of movement in the form-fit element 46a, 48a. The locking device 28a comprises a locking base body 50a. The form-fit elements 46a, 48a are incorporated in the locking base body 50a. The form-fit elements 46a, 48a are incorporated in an upper side of the locking base body 50a. The two form-fit elements 46a, 48a are preferably conjointly implemented. The two form-fit elements 46a, 48a are implemented as a common recess 52a. As a result of the form-fit elements 46a, 48a being conjointly implemented by the common recess 52a, the locking base body 50a can be of a particularly simple implementation. The locking base body 50a is preferably formed from a metal. The locking base body 50a is realized as a separate component. The locking base body 50a, in an assembly step, is preferably configured to be fixedly assembled on a component of the aircraft seat module, preferably of the door unit 22a or of the enclosure unit 14a. The locking base body 50a in the exemplary embodiment shown is preferably fixedly connected to the door unit 22a. The locking base body 50a is attached to an internal side of the door unit 22a. The locking base body 50a is preferably screwed to the door unit 22a. In principle, it would likewise be conceivable that the locking base body 50a is realized integrally with the door unit 22a. The locking base body 50a forms a surface which is elevated in relation to the internal side of the door unit 22a.

The electrically and/or electronically actuatable actuator device 56a is configured to be electrically and/or electronically actuated for unlocking the door unit 22a. The Spring-loaded locking elements 42a, 44a are actively adjustable to their unlocking position by the actuator device 56a. The actuator device 56a comprises an actuator 58a. The actuator 58a is embodied as an electromechanical actuator. The actuator 58a is preferably embodied as an electromagnetic actuator. The activation element of the actuator 58a is coupled to the two locking elements 42a, 44a. The two locking elements 42a, 44a can be adjusted by activating the actuator 58a. The two locking elements 42a, 44a, by activating the actuator 58a, can be adjusted from the locking position thereof to the unlocking position thereof. In a non-activated state of the actuator 58a, the activation element of the actuator 58a is disposed in a neutral position. In principle, it is conceivable that the actuator device 56a has two separate actuators 58a which are in each case coupled to one of the locking elements 42a, 44a and adjust the latter. The electrically and/or electronically actuatable actuator device 56a is attached to the enclosure unit 14a. The electrically and/or electronically actuatable actuator device 56a is preferably attached to the enclosure element 16a.

The locking device 28a comprises an actuation switch 60a. The actuation switch 60a is configured to emit a trigger signal which is configured to actuate the actuator device 56a. The actuator device 56a can be activated and thus switched to an activated state by means of the actuation switch 60a. The aircraft seat module preferably has a control apparatus 62a. The control apparatus 62a is preferably realized as an aircraft seat control apparatus. The trigger signal of the actuation switch 60a is preferably evaluated by the control apparatus 62a, and the actuator device 56a is correspondingly actuated.

The aircraft seat module comprises a sensor device 64a which is configured at least for detecting the door unit 22a in the open position. The sensor device 64a is embodied as a door position sensor. The sensor device 64a is configured to identify if the door unit 22a is disposed in the open position thereof and is correspondingly able to be locked by the locking device 28a. The sensor device 64a can preferably also be realized here as a stylus element which in the open position of the door unit 22a is activated by a corresponding detent. In principle, it is also conceivable that the sensor device 64a is implemented as a contactless sensor device.

The aircraft seat module comprises a spring device 68a which is, configured to impinge the door unit 22a with a spring force. The spring device 68a comprises two spring elements 70a, 72a. In principle, only one spring element 70a, 72a is also conceivable. The spring device 68a in functional terms disposed between the door unit 22a and the enclosure unit 14a. The spring device 68a is configured to exert a spring force acting in the closing direction on the door unit 22a. The spring device 68a is configured to exert in an open position of the door unit 22a a spring force on the door unit 22a so as to assist a closing movement of the door unit 22a. In a displacement of the door unit 22a in the opening direction 40a from the closed position in order for the locking device 28a to be unlocked by means of the actuation switch 60a, the spring device 68a is compressed. As a result, a spring force, by way of which a closing movement of the door unit 22a is advantageously assisted, can be advantageously increased by the displacement of the door unit 22a in the opening direction 40a.

The locking device comprises a locking state indication unit 74a. The locking state indication unit 74a is configured to detect and indicate, at least in the maximally open position of the door unit 22a, incomplete locking of at least one of the two locking elements 42a, 44a. The locking state indication unit 74a is configured to detect and indicate incomplete locking of the locking device 28a when at least one of the two locking elements is incompletely locked. The locking state indication unit 74a is configured to detect and indicate incomplete locking of the locking device 28a when only one of the locking elements 42a, 44a is incompletely locked. As a result of the detection of incomplete locking of one of the locking elements 42a, 44a, it can be identified at an advantageously early stage when one of the locking elements 42a, 44a is defective and can no longer be correctly locked, although the door unit 22a in the open position is locked by a correctly locked locking element 42a, 44a. A repair or a replacement of the one locking element 42a, 44a can be initiated at an advantageously early stage as a result, so that the failure of the other locking element 42a, 44a and thus the simultaneous defect of both locking elements 42a, 44a resulting therefrom can advantageously be avoided.

The locking state indication unit 74a is configured to indirectly detect and indicate incomplete locking of one of the locking elements 42a, 44a. The locking state indication unit 74a is configured to permit, in the event of incomplete locking of one of the locking elements 42a, 44a, a displacement of the locked door unit 22a by an indication length 76a in the closing direction 38a. In the process, the door unit 22a is displaceable by the indication length 76a, although said door unit 22b is locked by one of the locking elements 42a, 44a. In the event of incomplete locking of the door unit 22a by the locking device 28a, thus when one of the two locking elements 42a, 44a is incompletely locked, the door unit 22a is displaceable by the indication length 76a in the closing direction 38a. In the event of complete locking of the door unit 22a by means of the locking device 28a, thus when both locking elements 42a, 44a are completely locked, the door unit 22a is not able to be displaced in the closing direction 38a. The displacement of the door unit 22a by the indication length 76a in the closing direction 36a, in the event of incomplete locking of the locking device 28a, is indicated by the spring force of the spring device 68a. The spring device 68a, when the locking device 28a is not correctly locked as a result of the incomplete locking of a locking element 42a, 44a, pushes the door unit 22a by the indication length 76a in the closing direction 38a. The indication length 76a by which the door unit 22a is displaced for detecting incomplete locking, is preferably 5 mm. In principle, it is also conceivable that the indication length 76a is a value between 20 mm and 1 mm, for example 15 mm, 10 mm, 3 mm, or 1.5 mm.

The locking state indication unit 74a comprises a rocker element 78a. The rocker element 78a is configured to contact the locking elements 42a, 44a in the locking position thereof. In a locked state of the door unit 22a in the open position thereof, the locking elements 42a, 44a in a completely locked state bear on the rocker element 78a. As a result of both locking elements 42a, 44a bearing thereon in the completely locked state, the rocker element 78a is held in a non-deflected neutral position. The rocker element 78a is disposed so as to be pivotable in relation to the locking base body 50a. The locking state indication unit 74a has a connection frame 80a for attaching the rocker element 78a. The connection frame 80a is attached to the locking base body 50a. In principle, it would also be conceivable that the connection frame 80a is implemented integrally with the locking base body 50a. The connection frame 80a is disposed on a side of the locking base body 50a that faces the actuator device 56a. The connection frame 80a has a pass-through opening 82a which is larger than the recess 52a in the locking base body 50a which implements the form-fit elements 46a, 48a. The pass-through opening 80a permits access to the form-fit elements 46a, 48a formed by the recess 52a. The locking elements 42a, 44a in a completely locked state extend through the pass-through opening 82a of the connection frame 80a into the form-fit elements 42a, 44a formed by the recess 52a. The rocker element 78a is connected to the connection frame 80a. The rocker element 78a is pivotably connected to the connection frame 80a. The rocker element 78a is supported on the connection frame 80a so as to be pivotable around a pivot axis. The pivot axis around which the rocker element 78a is supported runs coaxially with the movement axes of the locking elements 42a, 44a. The pivot axis, measured perpendicularly, has an identical spacing from the movement axes of the locking elements 42a, 44a. The pivot axis is preferably disposed so as to be centric between the form-fit elements 46a, 48a implemented by the recess 52a. The rocker element 78a is preferably attached on a central axis of the recess 52a. The rocker element 78a, by way of a bearing bolt 84a, is pivotably connected to the connection frame 80a. The bearing bolt 84a implements the pivot axis.

The rocker element 78a is realised as a flat plate. The rocker element 78a has a contact side 86a. The contact side 86a of the rocker element 78a in an assembled state faces the recess 52a which implements the form-fit elements 46a, 48a. The contact side 86a in the neutral position is aligned so as to be parallel to a first side of the recess 52a. The locking elements 42a, 44a in the completely locked position thereof adjoin the contact side 86a on the rocker element 78a. In a position in which the locking elements 42a, 44a engage in the form-fit elements 46a, 48a, the contact side 86a of the rocker element 78a delimits a movement of the door unit 22a in the closing direction. The locking elements 42a, 44a in the completely locked position are supported on the rocker element 78a by way of the contact side 86a. The rocker element 78a implements a form-fit element of the locking device 28a for the locking elements 42a, 44a. In a completely locked state of the locking device 28a, in which both locking elements 42a, 44a are completely locked, the rocker element 78a implements a common form-fit element for the locking elements 42a, 44a (see figure). The rocker element 78a here is in the neutral position thereof when both locking elements 42a, 44a are completely locked. The two locking elements 42a, 44a, when both are completely locked, keep the pivotably supported rocker element 78a balanced, in particular in the neutral position. To this end, the rocker element 78a on the contact side 86a thereof has contacting regions on which the locking elements 42a, 44a bear.

The contacting regions have in each case a spacing of identical size from the pivot axis around which the rocker element 78a is supported. The two contact regions, one of the locking elements 42a, 44a bearing in each case thereon, are disposed on mutually opposite sides of the pivot axis of the rocker element 78a. The rocker element 78a has radiuses in lateral edge regions 92a, 94a of the contact side 86a. In a tilted state of the rocker element 78a, a space through which the not completely locked locking element 42a, 44a can be moved past the rocker element 78a into the recess 52a can be achieved as a result of the radiuses (see FIG. 5). In this way, repairing the not completely locked locking element. 42a, 44a can easily take place.

The rocker element 78a, in the event of incomplete locking of one of the locking elements 42a, 44a, is configured to be tilted by the other, completely locked locking element 42a, 44a and, as a result, to permit a displacement of the locked door unit 22a by the indication length 76a in the closing direction 38a. If one of the two locking elements 42a, 44a is not completely locked and does not engage in the recess 52a that implements the form-fit elements 46a, 48a, only the one completely locked locking element 42a, 44a thus bears on the rocker element 78a, in particular on the contact side 86a of the rocker element 78a. It is shown by way of example in FIG. 4 how only the upper locking element 42a is completely locked and the lower locking element 44a, for example as a result of a defect, is not completely locked. The completely locked locking element 42a engages in the recess 52a of the locking base body 52a. The not completely locked locking element 44a does not engage in the recess 52a of the locking base body 50a. The not completely locked locking element 44a is in the unlocking position. As a result, only the completely locked locking element 42a intersects the rocker element 78a and comes into contact with the latter. The other, not completely locked locking element 44a does not come into contact with the rocker element 78a. The rocker element 78a, as a result of the locked locking element 42a by bearing on one side thereon, loses balance and is pivoted by the spring force of the spring device 68a, the latter acting in the closing direction 38a on the door unit 22a. As a result of being pivoted, the rocker element 78a releases a path by way of which the door unit 22a can be displaced by the indication length 76a until the completely locked locking element 42a bears on a wall of the recess 52a, which implements the corresponding form-fit element 46a. The contact surface of the form-fit elements 42a, 44a in the closing direction is spaced apart from the contact side 86a of the rocker element 78a in the neutral position by the indication length. As a result of only one of the locking elements 42a, 44a bearing thereon on one side during tilting of the rocker element 76a, a displacement of the door unit 22a by the indication length 76a in the closing direction 38a can thus take place as a result of the spring force of the spring device 68a.

The locking state indication unit 74a comprises a sensor device 88a which is configured to indirectly detect incomplete locking of one of the locking elements 42a, 44a. The sensor device 88a is configured in particular to detect a displacement of the door unit 22a by the indication length 76a in the closing direction. The sensor device 88a is configured to emit a malfunction signal when the door unit 22a is displaced by the indication length in the closing direction 38a. The control apparatus 62a is configured to evaluate the malfunction signal of the sensor device 88a. By evaluating the malfunction signal of the sensor device 88a, the control apparatus 62a can advantageously determine a displacement of the door unit 22a by the indication length 76a and, as a result, detect incomplete locking of one of the two locking elements 42a, 44a. The sensor device 88a is implemented integrally with the sensor device 64a of the aircraft seat module, which is embodied as a door sensor unit. As a result, the sensor device 64a can advantageously be used for the locking state indication unit 74a, and components can thus be saved. In principle, it would of course also be conceivable that the locking state indication unit 74a has a sensor that is realized separately and detects a displacement of the door unit 22a by the indication length 76a in the closing direction.

The locking state indication unit 74a has an indication unit 90a. The indication unit 90a is configured to indicate incomplete locking of one of the two locking elements 42a, 44a. The indication unit 90a is configured to emit a visual signal if one of the two locking elements 42a, 44a is incompletely locked. The indication unit 90a is preferably configured to display at least two different output signals so as to indicate incomplete locking of one of the locking elements 42a, 44a, on the one hand, and complete locking of both locking elements 42a, 44a, on the other hand. The indication unit 90a is realized as an illumination element. The indication unit 90a that is realized as an illumination element is configured to represent at least two different colors. The indication unit 90a is configured, in the event of incomplete locking of one of the locking elements 42a, 44a, to emit a red light, for example, and a green light in the event of complete locking of both locking elements 42a, 44a. In principle, it is also conceivable that the indication unit 90a emits only one signal if one of the two locking elements 42a, 44a is not completely locked. In principle, it is likewise conceivable that the indication unit 90a is realized differently and emits a different visual, acoustic and/or haptic output signal. The indication unit 90a is disposed in an upper region of the door unit 22a separately from the locking elements 42a, 44a. As a result, the indication unit 90a is advantageously disposed at a height which can readily be seen by a person, for example a crew member. In principle, it is also conceivable that the indication unit 90a is disposed in an upper region of the enclosure unit 14a.

The locking state indication unit 74a preferably has a further indication unit 108a. The further indication unit 108a is of a purely mechanical implementation. The further indication unit 108a is preferably partially implemented by the door unit 22a. The further indication unit 108a has a first marking which is disposed on the door unit 22a. The indication unit 104a has a second marking which is disposed on the enclosure unit 14a. In a completely open position of the door unit 22a, in which both locking elements 42a, 44a are completely locked, the two markings of the indication unit 108a are congruent. If the door unit in a locking position of the door unit is displaced by the indication length 76a, because one of the two locking elements 42a, 44a is not completely locked, the markings of the indication unit 108a are no longer congruent as a result of which of one of the two locking elements 42a, 44a incomplete locking is indicated. In principle, it is also conceivable that the purely mechanical indication unit 108a has a viewing window in the door unit 22a, said viewing window in the event of a displacement of the door unit 22a by the indication length in the closing direction 38a being disposed so as to be congruent with an indication marking which in this instance can be seen from the aisle region 20a.

In an alternative design embodiment, it would in principle also be conceivable that the locking state indication unit 74a described above is of a purely mechanical implementation and has only the purely mechanical further indication unit 104a. In principle, it is also conceivable that the purely mechanical indication unit 104a can be dispensed with.

Figure 7:
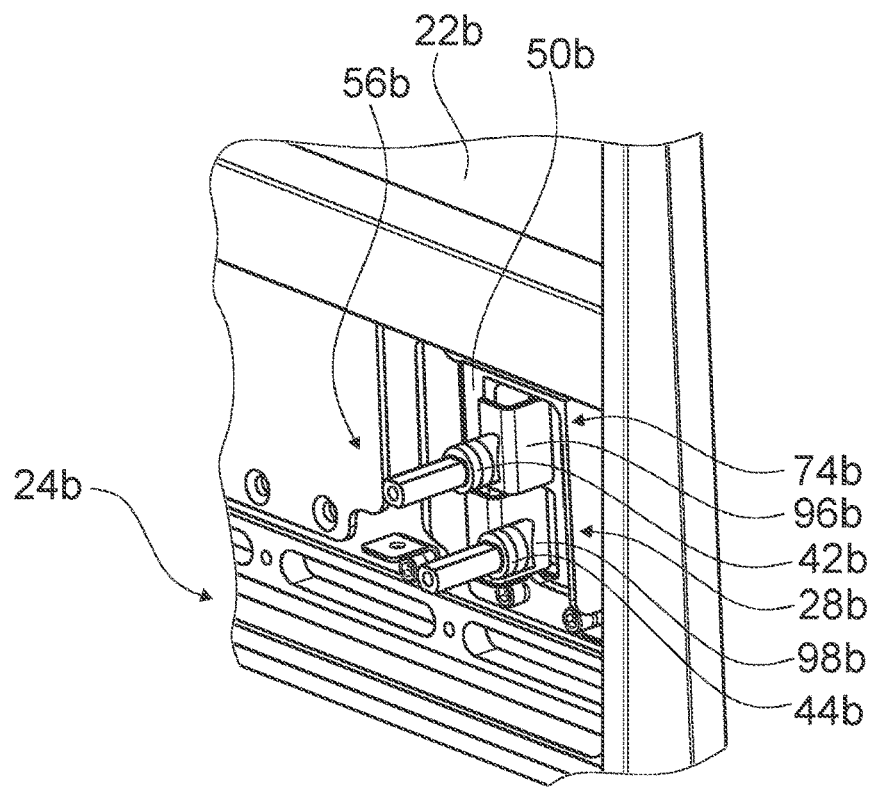
FIG. 7 shows a schematic illustration of a locking state indication unit in a second exemplary embodiment, which is of a purely mechanical implementation.
Figure 8:
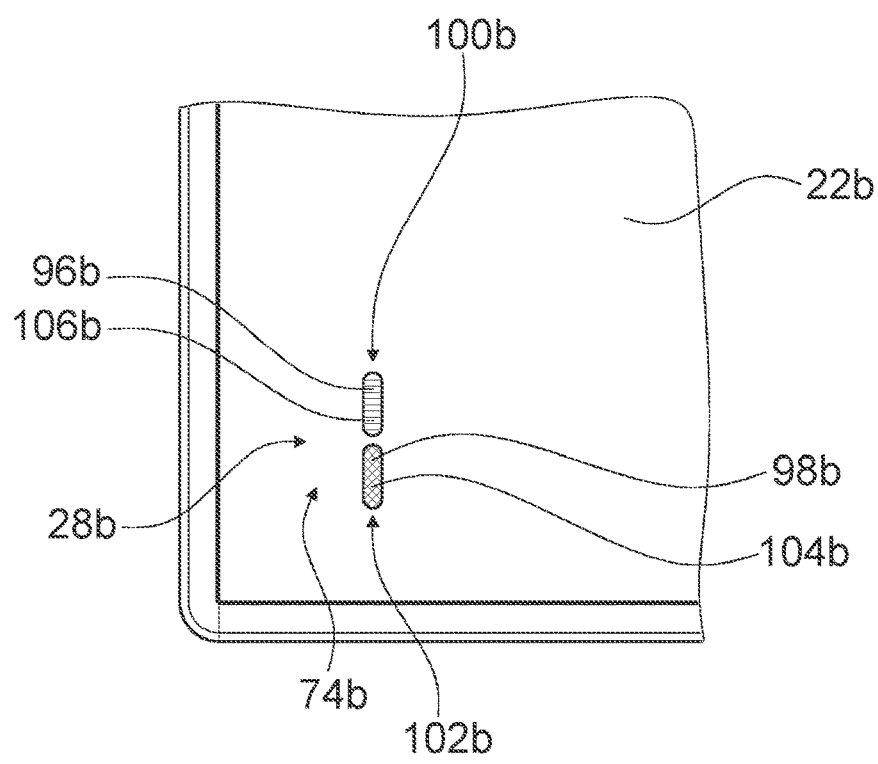
FIG. 8 shows a further view of the door unit having a locking state indication unit in the second exemplary embodiment.

A further exemplary embodiment of the invention is shown in FIGS. 7 and 8. The descriptions hereunder and the drawings are limited substantially to the points of differentiation between the exemplary embodiments, wherein reference in terms of identically designated components, in particular in terms of components with identical reference signs, in principle may also be made to the drawings and/or the description pertaining to the other exemplary embodiments, in particular those of FIGS. 1 to 6. For the purpose of differentiation of the exemplary embodiments, the suffix a is added to the reference signs of the exemplary embodiment in FIGS. 1 to 6. The suffix is replaced by the suffix b in the exemplary embodiments of FIGS. 7 to 8.

FIGS. 7 and 8 show part of an aircraft seat module in a second exemplary embodiment. The aircraft seat module comprises a door unit 22b. The door unit 22b is configured to, at least in one operating state, at least partially delimit a flight passenger seating area 10b from a contiguous cabin area, in particular an aisle region 20b. The aircraft seat module has a bearing device 24b for supporting the door unit 22b. The door unit 22b is displaceable between the open position and the closed position by means of the bearing device 24b. The aircraft seat module comprises a locking device 28b. The locking device 28b is configured to lock the door unit 22b in the maximally open stowage position. The locking device 28b comprises an electrically and/or electronically actuatable actuator device 56b. The actuator device 56b comprises a first locking element 42b. The actuator device 56b comprises a second locking element 44b.

The locking device comprises a locking state indication unit 74b. The locking state indication unit 74b is configured to detect and indicate, at least in the maximally open position of the door unit 22b, incomplete locking of at least one of the two locking elements 42b, 44b. FIGS. 7 and 8 show an alternative design embodiment of the locking state indication unit 74b. Instead of indirectly detecting incomplete locking of a locking element 42b, 44b, the locking state indication unit 74b of the second exemplary embodiment is configured to detect incomplete locking of a locking element 42b, 44b directly on the corresponding locking element 42b, 44b. As opposed to the first exemplary embodiment, the locking state indication unit 74b is of a purely mechanical implementation.

The locking state indication unit 74b has for each locking element 42b, 44b one spring-loaded indication element. 96b, 98b, said spring-loaded indication elements 96b, 98b being configured to be deflected, in the event of the door unit 22b being locked by the respective locking element 42b, 44b in the locking position, from a first position to a second position. The spring-loaded indication elements 96b, 98b are attached so as to be movable, in particular pivotable, on a locking base body 50b of the locking module. In principle, it would also be conceivable that the indication elements 96b, 98b are movably attached to the door unit. The indication elements 96b, 98b are configured to be adjusted by in each case one of the locking elements 42b, 44b during the adjustment of the latter to the locking position. In a neutral position, the indication elements 96b, 98b are in a first position which realizes a first indication position. The respective indication element 96b, 98b in the first indication position indicates a locking element that has been moved incompletely or not into the locking position. To this end, a first visible face 104b, which is colored red, for example, is visible in the first indication position. In the second position, which realizes a second indication position, the indication elements 96b, 98b are adjusted by the respective locking element. The respective indication element 96b, 98b in the second indication position indicates that the respective locking element 42b, 44b is completely locked. To this end, a second visible face 106b, which is colored green, for example, is visible in the second indication position. The locking state indication unit 74b has for each spring-loaded indication element 96b, 98b one viewing window 100b, 102b through which a position of the respective indication element 96b, 98b can be seen. Depending on a position of the indication elements 96b, 98b, the one of the two visible faces 104b, 106b to be displayed of the respective indication element 96b, 98b can in each case be seen through the viewing windows 100b, 102b.

The invention claimed is:

1. An aircraft seat module having a flight passenger seating area, with a door unit which in at least one operating state is configured at least to close a passage region to the flight passenger seating area, with a locking device for the door unit, which is configured to lock the door unit in an open position, in particular a maximally open stowage position, and to this end comprises at least one actuator device which has at least two movably supported locking elements, which are in each case adjustable between a locking position and an unlocking position, wherein the locking device has a locking state indication unit which at least in the maximally open position of the door unit is configured to detect and indicate incomplete locking of at least one of the two locking elements.

2. The aircraft seat module as claimed in claim 1, wherein the locking state indication unit has an indication unit which indicates incomplete locking of one of the two locking elements, is disposed separately from the locking elements and is preferably disposed in an upper region of the door unit.

3. The aircraft seat module as claimed in claim 1, wherein the locking state indication unit in the event of incomplete locking of one of the locking elements is configured to permit a displacement of the locked door unit by an indication length in the closing direction.

4. The aircraft seat module as claimed in claim 1, wherein the locking state indication unit has at least one rocker element which is configured to contact the locking elements in their locking position.

5. The aircraft seat module as claimed in claim 4, wherein the rocker element is supported so as to be pivotable around a pivot axis which runs coaxially with the axes of movement of the locking elements and is equidistant from the axes of movement of the locking elements.

6. The aircraft seat module as claimed in claim 4, wherein the rocker element in the event of incomplete locking of one of the locking elements is configured to be tilted by the other locking element and, as a result, to permit a displacement of the locked door unit by an indication length in the closing direction.

7. The aircraft seat module as claimed in claim 1, wherein the locking state indication unit comprises at least one sensor device which is configured to, in particular indirectly, detect incomplete locking of one of the locking elements.

8. The aircraft seat module as claimed in claim 7, wherein the sensor device is realized integrally with a sensor device that is embodied as a door position sensor.

9. The aircraft seat module as claimed in claim 1, wherein the indication unit is at least partially implemented by the door unit.

10. The aircraft seat module as claimed in claim 1, wherein the locking state indication unit for each locking element has one spring-loaded indication element, said spring-loaded indication elements, in the event of the door unit being locked by the respective locking element in the locking position, being configured to be deflected from a first position to a second position.

11. The aircraft seat module as claimed in claim 9, wherein the locking state indication unit has at least one viewing window through which a position of at least one of the indication elements can be seen.

12. The aircraft seat module as claimed at least in claim 1, wherein the locking state indication unit is of a purely mechanical implementation.

13. A locking state indication unit for an aircraft seat module as claimed in claim 1.

\* \* \* \* \*